US008244515B2

(12) United States Patent
Fernsler et al.

(10) Patent No.: US 8,244,515 B2
(45) Date of Patent: *Aug. 14, 2012

(54) STRUCTURE FOR DETECTING CLOCK GATING OPPORTUNITIES IN A PIPELINED ELECTRONIC CIRCUIT DESIGN

(75) Inventors: Matthew Earl Fernsler, Cedar Park, TX (US); Hans Mikael Jacobson, White Plains, NY (US); Johny Srouji, Austin, TX (US); Todd Swanson, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 177 days.

This patent is subject to a terminal disclaimer.

(21) Appl. No.: 12/347,968

(22) Filed: Dec. 31, 2008

(65) Prior Publication Data

US 2009/0217068 A1    Aug. 27, 2009

Related U.S. Application Data

(63) Continuation-in-part of application No. 11/842,491, filed on Aug. 21, 2007, now Pat. No. 8,073,669.

(51) Int. Cl.
*G06F 17/50* (2006.01)
(52) U.S. Cl. ....... 703/18; 703/15; 712/E9.062; 713/322; 713/323; 713/324
(58) Field of Classification Search .............. 703/13–19; 713/320; 712/E9.046, E9.062, E9.063
See application file for complete search history.

(56) References Cited

U.S. PATENT DOCUMENTS

| | | | |
|---|---|---|---|
| 6,247,134 B1 * | 6/2001 | Sproch et al. ................. | 713/320 |
| 7,035,785 B2 * | 4/2006 | Grochowski et al. ........... | 703/18 |
| 7,236,920 B2 * | 6/2007 | Grochowski et al. ........... | 703/18 |
| 7,263,624 B2 * | 8/2007 | Marchand et al. ............. | 713/324 |
| 2003/0070013 A1 * | 4/2003 | Hansson ........................ | 710/59 |
| 2004/0193846 A1 | 9/2004 | Sprangle | |
| 2005/0223253 A1 * | 10/2005 | Marchand et al. ............. | 713/322 |
| 2006/0288244 A1 * | 12/2006 | Cai et al. ........................ | 713/300 |
| 2007/0225959 A1 * | 9/2007 | Grochowski et al. ........... | 703/15 |
| 2007/0250798 A1 | 10/2007 | Chaudhry | |
| 2008/0307240 A1 * | 12/2008 | Dahan et al. .................. | 713/320 |

OTHER PUBLICATIONS

Zyuban et al., Integrated Analysis of Power and Performancefor Ppipelined Microprocessors, IEEE Transactions on Computers, vol. 53, No. 8, Aug. 2004, pp. 1004-1016.*
Benini et al, System-Level Dynamic Power Management, IEEE, 0-7695-0019-6/99, 1999, pp. 23-31.*
Mohamood et al, Noise-Direct: A Technique for Power Supply Noise Aware Floorplanning Using Microarchitecture Profiling, Asia and South Pacific Design Automation Conference, 2007, pp. 786-791.*

(Continued)

*Primary Examiner* — Russell Frejd
(74) *Attorney, Agent, or Firm* — Matt Talpis; Mark P Kahler

(57) ABSTRACT

A design structure for a pipeline electronic processor device may be embodied in a machine readable medium for designing, manufacturing or testing a processor integrated circuit. The design structure may embody a pipeline electronic circuit that enables power conservation in the stages of the pipeline via a simulation that identifies clock-gating opportunities among the stages of the pipeline. In one embodiment, simulation results assist a designer in the design of the pipeline electronic circuit design structure to achieve power conservation by incorporating clock-gating circuitry among the stages of the pipeline at clock gating opportunity locations that the simulation identifies.

18 Claims, 7 Drawing Sheets

OTHER PUBLICATIONS

AMD—Clock Gating Recommendations—AMD, pp. 1-2 (Aug. 1995).
Donno—Power Aware Clock Tree Planning—ISPD, pp. 138-147 (Apr. 2004).
Emnett—Power Reduction Through RTL Clock Gating, SNUG, pp. 1-11 (2009).
Jacobson—Improved Clock Gating Through Transparent Pipelining—IBM TJ Watson Research Center pp. 26-31 (Sep. 14, 2004).
Li—Deterministic Clock Gating for Microprocessor Power Reduction—Purdue pp. 1-10 (2003).
Luo—Low Power Network Processor Design Using Clock Gating—IEEE, pp. 1-6 (Jun. 2005).

* cited by examiner

STRUCTURE FOR DETECTING CLOCK GATING OPPORTUNITIES IN A PIPELINED ELECTRONIC CIRCUIT DESIGN

CROSS REFERENCE TO RELATED PATENT APPLICATIONS

This patent application is a continuation-in-part of, and claims priority to, the U.S. patent application entitled "Method and Apparatus For Detecting Clock Gating Opportunities in an Pipelined Electronic Circuit Design", inventors Fernsler, et al., Ser. No. 11/842,491 filed on Aug. 21, 2007, now U.S. Pat. No. 8,073,669, that is assigned to the same Assignee as the subject patent application, the disclosure of which is incorporated herein by reference in its entirety.

TECHNICAL FIELD OF THE INVENTION

The disclosures herein relate to electronic circuits, and more particularly, to the efficient design of pipeline electronic circuits by detection of power reduction opportunities.

BACKGROUND

An information handling system (IHS) may include multiple processors for processing, handling, communicating or otherwise manipulating information. Each processor may itself include multiple processor cores that work together to process information. A processor or processor core may include several pipeline stages to increase the effective throughput of the processor. Pipelining enables the processor or processor core to obtain greater efficiency by performing operations in parallel. The transition to multi-core processor designs tends to increase power dissipation issues in processors.

Total power consumption is now one of the major concerns in processor design such as multi-core processor design. Excessive processor power consumption can cause the processor to function improperly. Moreover, excessive power consumption without adequate heat dissipation can cause a processor to become unstable or permanently damaged. External cooling devices such as fans, coolers and radiators are effective up to a point in addressing the problem of high power dissipation and the resultant heat generation by high performance processors. Unfortunately, these devices are typically expensive and noisy. Moreover, these cooling devices are often bulky and require special design and packaging methods that are not desirable especially in portable or battery powered systems.

Power dissipation or consumption in processors includes two main aspects, namely leakage power dissipation and active power dissipation. Leakage power dissipation increases as semiconductor manufacturing processes shrink processor elements smaller and smaller. In contrast, active power dissipation relates mainly to the activity of the processor at a particular workload. For example, the activity of sequential elements such as latches is one cause of active power dissipation in processors. Data switching by combinational logic in the processor is another cause of active power dissipation. Latches in the pipeline stages of a processor cause a significant amount of power consumption. Latch-based elements include flip-flops, data storage logic, registers, switching components, and other components in the processor. Better control of latch-based element operations represents a significant opportunity for power reduction in a processor.

Latch clocking is a major component of the active portion of power consumption and dissipation in processors. Clocking a latch, whether the latch changes state or not, causes the latch to consume power. Reducing latch clock activity to reduce power consumption is desirable, but presents a major design challenge in complex processors. "Clock gating" achieves a significant reduction in latch clock power consumption. Clock gating is a technique that turns off or interrupts the clock signal to the clock input of a particular latch or set of latches under certain conditions without harm to latch functionality. A "clock-gated" latch is a term that describes a latch in a state wherein clock gating circuitry turns off or interrupts the latch's clock signal. Otherwise, the latch operates normally. A "clock-gated" latch will not actuate, toggle, or otherwise change state during the normal clock cycle input. This blocking of the clock signal input and the ensuing static state of the latch provides power savings for the processor. Determining when to clock gate a latch and when not to clock gate a latch presents a significant design challenge to the processor designer. Basically, it is acceptable to clock gate a latch during a particular clock cycle, when the state of the latch will not change during that particular clock cycle, or when the state change of the latch has no impact on subsequent downstream logic. However, making this determination of when to clock gate and when not to clock gate is the challenge. One approach to designing clock gating logic is to conduct a manual study to determine those times when the data in the latch is the same data present on the latch's input (i.e. Din=Qout). Simulation is also useful to determine clock gating opportunities. However, these approaches may be too pessimistic in assessing clock gating opportunities. Even after a designer carefully uses these design practices to generate clock gating logic for the processor, there are likely still complex scenarios that the designer may not fully investigate that could yield further clock gating opportunities.

What is needed is a design structure for an apparatus that more completely identifies clock gating opportunities in a pipelined electronic processor device.

SUMMARY

Accordingly, in one embodiment, a design structure embodied in a machine readable medium for designing, manufacturing, or testing an integrated circuit, is disclosed. The design structure includes a including a plurality of pipeline stages, the plurality of pipeline stages including first and second pipeline stages that each include logic elements that may be clock-gated, each pipeline stage supplying information to a downstream pipeline stage, wherein selected logic elements are clock-gated based on a simulation of the pipeline electronic processor device that specifies the selected logic elements that may be clock-gated under predetermined conditions to achieve power conservation.

In another embodiment, a hardware description language (HDL) design structure is encoded on a machine-readable data storage medium. The HDL design structure includes elements that when processed in a computer-aided design system generate a machine-executable representation of a pipeline electronic processor device. The HDL design structure includes a first element processed to generate a functional computer-simulated representation of the pipeline electronic processor device including a plurality of pipeline stages, the plurality of pipeline stages including first and second pipeline stages that each include logic elements that may be clock-gated, each pipeline stage supplying information to a downstream pipeline stage, wherein selected logic elements are clock-gated based on a simulation of the pipeline electronic processor device that specifies the selected logic elements that may be clock-gated under predetermined conditions to achieve power conservation.

In yet another embodiment, a method in a computer-aided design system for generating a functional design model of a pipeline electronic processor device is disclosed. The method includes generating a functional computer-simulated representation of the pipeline electronic processor device including a plurality of pipeline stages, the plurality of pipeline stages including first and second pipeline stages that each include logic elements that may be clock-gated, each pipeline stage supplying information to a downstream pipeline stage, wherein selected logic elements are clock-gated based on a simulation of the pipeline electronic processor device that specifies the selected logic elements that may be clock-gated under predetermined conditions to achieve power conservation.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

In processors, clock gating provides an opportunity to reduce active power consumption. The basic methodology for designing or generating clock gating logic is to block the clock signals for a particular clock cycle to respective latches that do not require the clock signal for that particular clock cycle. If the state of a latch will not change for a particular clock cycle, then it is not necessary to send the clock signal to that latch for that particular clock cycle. By "clock gating" or blocking the clock signal to a latch, the latch does not transition through a clock latch or toggle state. As a consequence, the latch does not consume power that the latch would otherwise consume if clock gating were not present. Each "clock-gated" latch contributes to the overall power saving the processor achieves for a particular clock cycle via clock gating.

Although previous approaches that utilize statistical analysis for finding clock gating opportunities may reduce total power consumption in processors, these methods may fail to impose the constraints and take advantage of opportunities for clock-gating that pipeline systems and pipeline electronic circuits provide.

One approach to identifying clock gating opportunities is disclosed in the copending U.S. patent application entitled "Method And Apparatus In Locating Clock Gating Opportunities Within A Very Large Scale Integration Chip Design", inventors Chaudhry, et al., Ser. No. 11/380,126 filed Apr. 25, 2006 and assigned to the same Assignee, the disclosure of which is incorporated herein by reference in its entirety.

One basic way to understand clock gating opportunities is to consider the scenario wherein the output of a latch or group of latches does not change during a clock transition or clock cycle. Typically this is a result of the data input to the latch remaining in a static state and the output of the latch likewise remaining in a constant state during the clock transition. Another clock gating opportunity is the scenario wherein the output data of a latch is equal to the current input data of the latch during a particular clock cycle. In this straightforward scenario, discrete clock gating logic may block, remove, or otherwise cancel the clock signal to the latch with no resultant change in the latch's output state. Such a "clock-gated" latch will not attempt to alter its state. For this reason, the power consumption of that latch is less than it would otherwise be.

Figure 1:
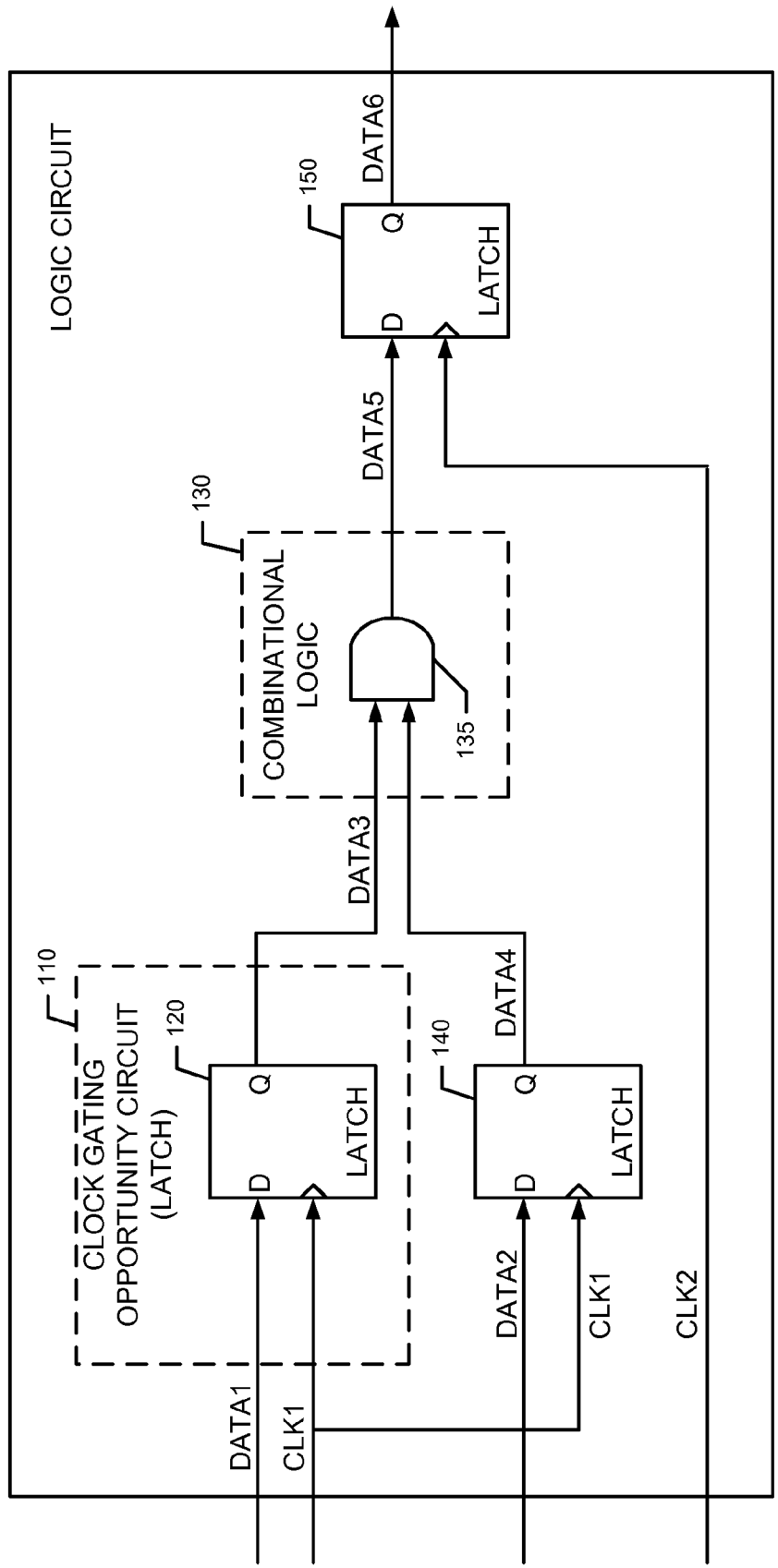
FIG. 1 shows a block diagram of an electronic circuit that demonstrates the opportunity for clock gating.

As seen in FIG. 1, a conventional logic circuit 100 includes a clock gating opportunity circuit 110, namely a latch 120 in this particular example. In logic circuit 100, latches 120 and 140 connect through discrete combinational logic 130, for example AND gate 135, to another latch 150 that provides a data output signal. In one embodiment, logic circuit 100 may represent a portion of a much larger and more complex logic circuit (not shown). For example, logic circuit 100 may be part of a processor or other digital logic circuit.

Latch 120 represents a typical latch circuit with data and clock inputs and a latching data output signal. More specifically, an input data signal DATA1 from another circuit logic (not shown) provides data input to latch 120. Under certain signal conditions, latch 120 is a candidate for clock gating. In other words, an opportunity may exist for clock gating latch 120 under some conditions. For this reason, the term "clock gating opportunity" circuit 110 applies to latch circuit 120, as shown in FIG. 1.

The output of latch 120, shown as signal DATA3, couples to the input of combinational logic 130, namely to one of two inputs of AND gate 135. A clock signal CLK1 provides clocking to latch 120 and latch 140. Clock circuitry (not shown) may generate individual clock signals, such as CLK1, from a master clock signal within the processor or other electronic circuit that employs logic circuit 100. Latch 140 receives a DATA2 signal as data from other functional logic (not shown). The output of latch 140, shown at signal DATA4, couples to another input of combinational logic 130, namely to the second of two inputs of AND gate 135. Combinational logic 130 represents any amount of discrete gate and transistor logic that Boolean functions may express for purposes of circuit analysis. The output of combinational logic 130, and more specifically the output of AND gate 135, couples to the data input of a latch 150 as shown at signal DATA5. Latch 150 receives a clock input signal CLK2. Latch 150 generates output signal DATA6 that provides an input signal to other downstream functional logic (not shown).

Logic circuit 100 presents an opportunity for clock gating under certain conditions. The example below shows one such condition. If the DATA4 signal at the output of latch 140 exhibits a logic zero "0", then the corresponding input of AND gate 135 exhibits a logic zero "0". In this scenario, by Boolean algebra, the output of AND gate 135 is also a logic zero "0" (i.e. the DATA5 signal exhibits a logic zero "0"). In this example the output signal DATA3 of latch 120, regardless of its logic state (namely 1 or 0), has no impact on the output signal DATA5 of AND gate 135. Analysis of the output state of latch 120 may consider the state of latch 120 as a "do not care" (DNC) condition. For the next sequential logic function, namely latch 150 in this particular example, the state of latch 120 is not relevant. Moreover, for the conditions of the example above, which also describes a typical clock cycle, latch 120 represents an ideal opportunity for clock gating during that particular clock cycle. Under these conditions wherein latch 120 offers an opportunity for clock gating, an appropriate alternative name for latch 120 is clock gating opportunity circuit 110.

Figure 2:
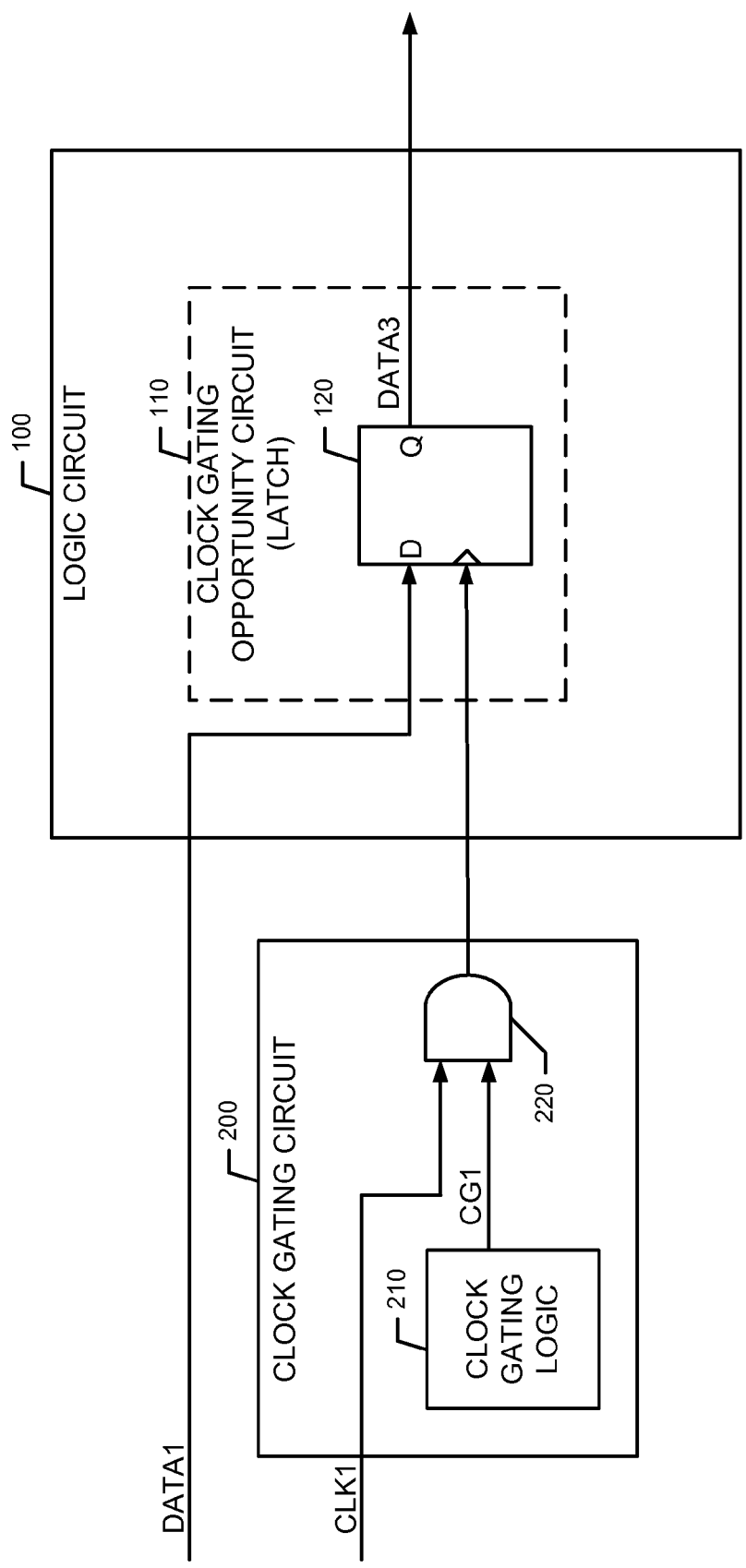
FIG. 2 shows a diagram of the clock gating technology for use in electronic circuits.

FIG. 2 is a block diagram of a representative conventional clock gating circuit 200 that couples to clock gating opportunity circuit 110 in logic circuit 100. For convenience, FIG. 2 does not repeat the entire logic circuit 100, but rather just shows the clock gating opportunity circuit 110 and latch 120 thereof. By analysis of clock gating opportunities, circuit designers may incorporate clock gating logic such as clock gating logic circuit 210 into an electronic circuit such as a processor. "Clock gating" is a method utilizing a circuit, typically an AND or NAND gate or other logic circuit, that blocks the propagation of a clock signal to a logic component such as a latch or group of latches. Circuit designers use the clock gating logic 210 to block the propagation of clock signals to a specific latch under predetermined conditions wherein the clock will have no effect on the functionality of the clock gating opportunity circuit 110. In the presence of these predetermined conditions, the clock signal effectively does not reach the latch or latches because of the action of the clock gating circuit.

The output of clock gating logic 210, shown as signal CG1, couples to one of two inputs of AND gate 220. The remaining input of AND gate 220 receives the clock signal CLK1 input from other functional logic of an electronic circuit (not shown). By using signal CG1 as input to AND gate 220, the clock gating logic 210 provides a hardware component that may effectively block the CLK1 signal under certain conditions for which clock gating is appropriate. When the output signal CG1 of clock gating logic 210 exhibits a logic zero "0", AND gate 220 generates an output signal of logic zero "0" regardless of the input state from signal CLK1. The output of AND gate 220 couples to the clock input of latch 120 within clock gating opportunity circuit 110. When the clock gating logic 210 outputs a CG1 signal exhibiting a logic zero "0" state, the input data signal to latch 120, namely DATA1, has no effect on latch 120, and thus constitutes a "do not care" DNC input. More particularly, latch 120 will not clock the input data shown as data signal DATA1. In this condition, latch 120 causes no change to the latch output signal DATA3 that flows to a next sequential logic circuit (not shown). Moreover, latch 120 will not generate a transition state and thus will not consume transition latch state power. However, if the output signal CG1 of clock gating logic 210 exhibits a logic one "1", then AND gate 220 will pass the state of clock signal CLK1 through to the clock input of latch 120. In this scenario, clock gating logic 210 does not "clock gate" or interfere with latch 120.

The approach in the example of FIG. 2 does not consider clock gating in a complex processor architecture including multiple pipelined stages as described below. Clock gating opportunities exist in a complex pipeline architecture. Simulation of electronic circuits and analysis of signal nodes within an electronic circuit represent one method for identifying clock gating opportunities. Signal nodes are discrete traces or connections in a simulation model of the circuit that represent connection points between functions expressible as Boolean logic. A simulation of an electronic circuit can be seen as a collection of interconnecting nodes and Boolean logic functional blocks. One embodiment of the exemplary method disclosed below includes generating real work load simulations of data in the simulation model and further operating the simulation model identically in signal state as the real circuit. In one embodiment, the simulation model and programs operate the simulation in a real work load state and monitor signal nodes for clock gating opportunities.

Figure 3:
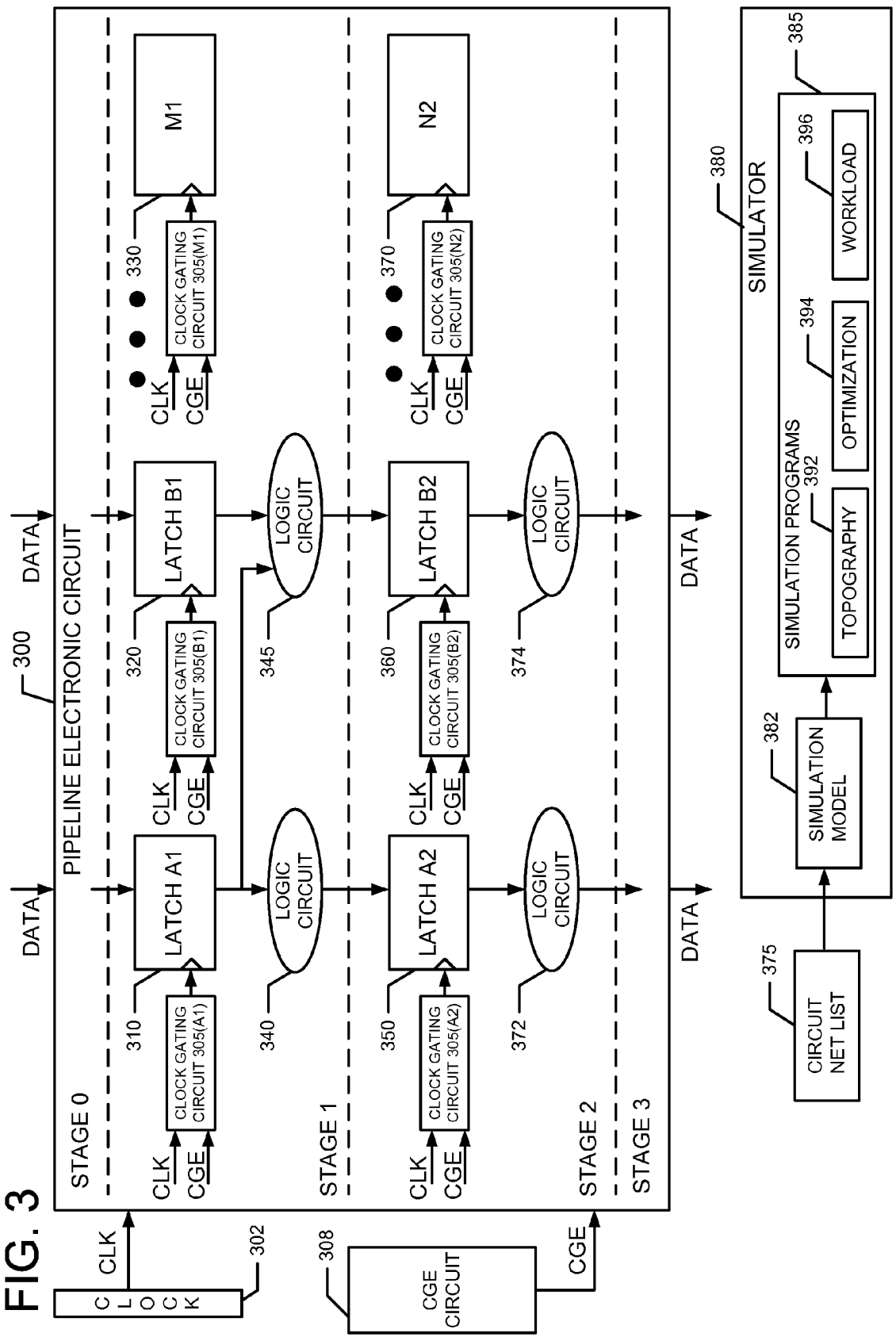
FIG. 3 shows a block diagram of a pipeline electronic circuit demonstrating the effective use of the clock gating methodology.

FIG. 3 shows a pipeline design that demonstrates the disclosed methodology of detecting clock gating opportunities in a pipeline electronic circuit 300 such as a processor. Pipeline electronic circuit 300 represents a portion of a larger pipeline circuit (not shown). Pipeline electronic circuit 300 includes multiple stages, namely representative pipeline stages STAGE 0, STAGE 1, STAGE 2 and STAGE 3 of which STAGE 1 and STAGE 2 are shown in more detail. The output data of STAGE 0 provide the input data for STAGE 1. The output data of STAGE 1 provide the input data for STAGE 2, and so forth to further downstream stages of the pipeline electronic circuit 300. In this particular embodiment, STAGE 1 is upstream from STAGE 2, meaning that data flows downstream from STAGE 1 to STAGE 2.

The pipeline electronic circuit 300 of FIG. 3 includes a master clock circuit 302 that provides a master clock signal (CLK) to the circuits of the pipeline stages, such as STAGE 1 and STAGE 2, for example. Clock circuit 302 couples to a clock gating circuit 305(A1), a clock gating circuit 305(B1), and so forth . . . up to a clock gating circuit 305(M1) of STAGE 1 to provide the CLK signal thereto. To avoid crowding in FIG. 3, the actual coupling is not shown. The second alphanumeric expression of each clock gating circuit, for example 305(A1), namely "1" represents the pipeline stage number in which that circuit resides. Clock circuit 302 also couples to a clock gating circuit 305(A2), a clock gating circuit 305(B2), and a clock gating circuit 305(N2) of STAGE 2 to provide the CLK signal thereto. Clock gating circuit 305(A1) couples to the clock input of a latch A1 (310) of STAGE 1 of pipeline electronic circuit 300. In FIG. 3, the second alphanumeric representation for each latch depicts the stage number location of the latch. For example, the latch A1 representation depicts a second alphanumerical value of "1" representing stage 1 of the pipeline electronic circuit of FIG. 3. Clock gating circuit 305(B1) couples to the clock input of a latch B1 (320) of STAGE 1. Clock gating circuit 305(M1) couples to clock input of a latch M1 (330) of STAGE 1. The clock gating circuit 305(A2) couples to the clock input of a latch A2 (350) of STAGE 2 of pipeline electronic circuit 300. Clock gating circuit 305(B2) couples to clock input of a latch B2 (360) of STAGE 2. The clock gating circuit 305(N2) couples to the clock input of a latch N2 (370) of STAGE 2. Pipeline electronic circuit 300 exhibits a sequential architecture. In other words, data flows from pipeline stage to pipeline stage through latches and logic elements in lock step with the master clock signal, CLK. Data moves from one stage to the next as the clock signal CLK advances from a representative clock cycle N to the next clock cycle N+1.

The following discussion describes the flow of data through pipeline electronic circuit 300 with respect to clock cycles. For example, if data input from STAGE 0 to latch A1 (310) of STAGE 1 clocks through latch A1 (310) in a clock cycle N, then latch A1 of STAGE 1 stores the value of that data during that clock cycle N. However, in the next clock cycle N+1, latch A2 (350) of STAGE 2 stores the result of logic circuit 340's operation on the latch A1 data. Thus, in the clock cycle N+1, data flows from latch A1 of STAGE 1 to latch A2 of STAGE. Latch A2 then stores that data. In this manner, data moves from an upstream stage such as STAGE 1 to a downstream stage such as STAGE 2 from one clock cycle to the next clock cycle in pipeline fashion. Arrows pointing downward in FIG. 3 indicate this upstream to downstream data flow through the pipeline stages of electronic circuit 300.

In more detail, data from pipeline STAGE 0 flow downstream to the input of latch A1 of STAGE 1 and data from pipeline STAGE 0 also flow downstream to the input of a latch B1. Each stage of pipeline electronic circuit 300 includes pipeline logic with multiple latches. For example, STAGE 1 includes latch A1 (310), latch B1 (320), . . . latch M1 (330). Latch M1 (330) represents any multiple number of latches "M" in STAGE1 of pipeline electronic circuit 300. The output of latch A1 (310) couples to the inputs of both a logic circuit 340 and a logic circuit 345 as shown. Both logic circuit 340 and logic circuit 345 represent any amount of combinational logic that is expressible as a Boolean function for purposes of operation and simulation. The output of latch B1 (320) of STAGE 1 of the pipeline electronic circuit 300 couples to the input of logic circuit 345. In actual practice, STAGE 1 of the pipeline may contain more logic elements than shown.

The output of logic circuit 340 of STAGE 1 couples to the input of a latch A2 (350) in STAGE 2 of the pipeline circuit. The output of logic circuit 345 of STAGE 1 couples to the input of a latch B2 (360) in STAGE 2. In actual practice, STAGE 2 may include many more latches than shown. For example, STAGE 2 includes latch A2 (350), latch B2 (360), . . . latch N2 (370). Latch N2 (370) represents any multiple number of latches "N" in STAGE 2 of pipeline electronic circuit 300. The output of latch A2 couples to the input of a logic circuit 372. The output of latch B2 couples to the input of a logic circuit 374. The outputs of logic circuits 372 and 374 couple to the input latches (not shown) of the next downstream stage in the pipeline electronic circuit, namely STAGE 3. In actual practice, pipeline electronic circuit 300 may include many more stages than shown in the representative circuit of FIG. 3.

FIG. 3 shows pipeline electronic circuit 300 to demonstrate a number of conditions in which clock gating is possible for pipelined stages in accordance with the disclosed methodology. Table 1 below shows 5 representative cases where clock gating opportunities exist in a pipelined environment such as shown in FIG. 3:

TABLE 1

| Case | Condition | Result |
| --- | --- | --- |
| 1 | If circuit 300 clock-gates latch A1 in clock cycle N, or latch A1 does not change logic state in clock cycle N | Then circuit 300 may potentially clock-gate latch A2 in clock cycle N + 1 |
| 2 | If circuit 300 clock-gates latch A1 and latch B1 in clock cycle N, or latch A1 and latch B1 do not change logic state in clock cycle N | Then circuit 300 may potentially clock-gate latch A2 and latch B2 in clock cycle N + 1 |
| 3 | If latch B2 does not change logic state in clock cycle N + 1 | Then circuit 300 may potentially clock-gate latch B1 in cycle N |
| 4 | If latch A2 does not change logic state in clock cycle N + 1 | Then circuit 300 may potentially clock-gate latch A1 in cycle N |
| 5 | If circuit 300 clock-gates latch A2 and latch B2 in clock cycle N + 1 or if latch A2 and latch B2 do not change logic state in clock cycle N + 1 | Then circuit 300 may potentially clock-gate latch A1 and latch B1 in cycle N |

In the first case or scenario of Table 1, if clock gating circuit 305(A1) clock-gates latch A1 (310) during clock cycle N, or alternatively, if the logic state or value that latch A1 stores does not change in clock cycle N, then clock gating circuit 305(A2) may potentially clock-gate latch A2 (350) in the next clock cycle N+1. In this scenario, latch A1 does not represent any change of data flow through the pipeline circuit stages and as a result, latch A1 does not need to function. The condition of latch A1 is a "do not care" (DNC) condition because the state of latch A1 is irrelevant to downstream functions during the current clock cycle. For this reason, clock gating circuit 305(A1) may clock-gate or effectively hold latch A1 in its current state.

In the second case or scenario of Table 1, if clock gating circuit 305(A1) clock-gates latch A1 (310) and clock-gating circuit 305(B1) clock-gates latch B1 (320) during clock cycle N, then in the next clock cycle N+1, clock gating circuits 305(A2) and 305(B2) may respectively clock-gate latch circuit A2 (350) and latch circuit B2 (360). This is so because the states or values of clock-gated latches A1 and B1 are "do not cares" (DNCs) for the clock cycle N+1 from the perspective of downstream latches A2 and B2.

In the third case or scenario of Table 1, if the value of latch B2 (360) does not change in clock cycle N+1, then clock gating circuit 305(B1) may clock gate latch B1 (320) in clock cycle N. This is true because the output of latch B1 in clock cycle N has no effect on the output value of latch B2 in clock cycle N+1. Similarly, in the fourth case or scenario of Table 1, if the value of latch A2 (350) does not change in clock cycle N+1, then clock gating circuit 305(A1) may clock gate latch A1 (310) in clock cycle N. This is so because the output of latch A1 in clock cycle N has no effect on the output value of latch A2 in clock cycle N+1.

The fifth case Table 1 describes a scenario wherein both latch A2 (350) and latch B2 (360) do not change logic state or output value in clock cycle N+1, or alternatively, both latches A2 and B2 exhibit clock-gating. In other words, clock gate circuit 305 (A2) and clock gate circuit 305 (B2) respectively clock-gate latches A2 and B2 during clock cycle N+1. In this scenario, both latch A1 and latch B1 are potential candidates for clock gating in clock cycle N, because the outputs of both latch A1 and latch B1 during clock cycle N exhibit no effect on latch A2 and latch B2 in clock cycle N+1. The ability to look both upstream and downstream through the latch logic of FIG. 1 to recognize clock gating opportunities enables significant power reduction potential in this pipeline circuit design. For one example, evaluating downstream states of latches A2 and B2 as they relate to upstream latches A1 and B1 during a clock cycle N, in FIG. 3, provides data for evaluating clock gating opportunities.

In electronic circuit design, a designer may express a particular logic circuit as a net list. In the case of a logic circuit such as pipeline electronic circuit 300, the designer either manually or with computer assistance generates a net list 375 that describes the attributes and connections of electronic circuit 300. Net list 375 is a list of connections and logic functions that represents the functional logic of pipeline the pipeline stages of electronic circuit 300. The designer or others may employ conventional net list generation techniques to generate net list 375. Net list 375 includes net list data that describe pipeline electronic circuit 300. This net list data is input to a simulator 380 as shown in FIG. 3. Simulator 380 uses the net list data of net list 375 to generate a software simulation model 382 representative of the operation of the various stages and components of pipeline electronic circuit 300. The simulation model 382 of pipeline electronic circuit 300 represents a software model of each interconnecting node and functional logic component or circuit of each stage of pipeline electronic circuit 300. Simulator 380 can simulate each input node in software, including clock signal inputs, data signal inputs, input data busses, and other input signals of pipeline electronic circuit 300. Simulation model 382 provides a tool for simulation and analysis of the Boolean expression for each node per clock cycle of pipeline electronic circuit 300. Simulator 380 includes simulation programs 385. In one embodiment, simulation programs 385 include a topography program 392, an optimization program 394, and a workload simulation program 396. Simulator 380 may include other programs (not shown) for simulation support of pipeline electronic circuit 300.

Simulator 380 may run topography program 392 to provide physical parameters to include for use in the clock gating opportunity decision making process in pipeline electronic circuit 100. Topography program 392 may employ topographic data in this decision making process. Topographic data may include connection trace widths, interconnecting trace lengths, physical proximity of the discrete transistors of logic circuit functions and other useful circuit design parameters of the pipeline electronic circuit 300. Simulator 380 may execute optimization program 394 to reduce the complexity of the simulation model 382 and to further aid in the identification of clock gating opportunities in circuit 300. The optimization program 394 reduces the complexity of simulation model 382 by combining latches and logic functions in cases where such combining will not affect the detection of clock gating opportunities or functionality of the circuit design. For example, optimization program 394 may combine or group multiple latches into a single latch for the simulation only, wherein such a group of latches receives clock and data signals from the same source.

By applying software simulation programs 385 to a pipeline electronic circuit such as shown in FIG. 3 above and applying therein the clock-gating scenarios of Table 1, system simulator 380 can develop a more accurate and expansive representation of clock gating opportunities in circuit 300. The above methodology for identifying clock gating opportunities exemplified in FIG. 3 and Table 1 is well-suited for complex pipeline designs. By taking into account additional stages, not shown of the latch logic of pipeline electronic circuit 300, more data nodes are available to simulator 380. More data nodes provide simulator 380 with additional read data during execution of simulation programs 385. Also, by taking into account more clock cycles, such as N+2, N+3, and so on, in each stage of the pipeline circuit, more data is available to simulator 380. With more available data, simulator 380 may locate more accurate and realistic clock gating opportunities by using the teachings herein such as the representative clock gating scenarios of Table 1.

If done manually, finding the opportunities for clock gating for the examples above is a tedious and time consuming task. For that reason, FIG. 3 includes simulator 380 for simulating both the pipeline electronic circuit 300 as well as the workload environment in accordance with the scenarios of Table 1. In one embodiment, simulator 380 generates simulation model 382 of pipeline electronic circuit 300 using register transfer level (RTL) language. RTL is a high level descriptive language for defining digital electronic circuits. RTL models describe electronic circuits as a software collection of latches and Boolean logic expressions. By running a true workload on the model, namely inputting actual representative data into the input nodes of the simulation model 382, workload simulation program 396 reads actual circuit results at each node in the simulator 380. By analyzing the results of each node stage by stage of the simulation model 382, workload simulation program 396 generates a collection of clock gating opportunities that are consistent with the scenarios of Table 1. The simulator 380 can analyze the clock gating opportunity results and organize the data by scenarios such as those of Table 1, and other criteria. Simulator 380 can present the data to the end user or designer for analysis. These results may be useful in the redesign or future design of electronic circuits.

The ability to turn clock gating on or off represents a useful feature of clock gating logic in pipeline electronic circuit 300. End users may wish to disable the clock gating logic in entirety without impact to the logical functionality of the pipeline electronic circuit. Disabling the clock gating circuitry has the effect of increasing power consumption for the circuit coincident with the power savings that clock gating provides. Disabling the clock gating logic provides a mechanism to test the pipeline electronic circuit 300 with no clock gating effects. The pipeline electronic circuit 300 includes a master clock gating enable (CGE) circuit 308 that provides a CGE signal to each of the pipeline stages. The clock gating enable (CGE) circuit 308 couples to clock gating circuits 305(A1), 305(B1), and 305(M1) of STAGE 1 to provide the clock gating enable signal thereto. The clock gating enable CGE signal can exhibit one logic state to enable clock gating throughout pipeline electronic circuit 300 and exhibit the opposite logic state to disable clock gating throughout circuit 300. CGE circuit 308 couples to clock gating circuits 305(A2), 305(B2), and 305(N2) of STAGE 2 to provide the clock gating enable signal thereto. FIG. 3 depicts a representative pipeline electronic circuit 300 including multiple stages and multiple latches and combinational logic. Pipeline electronic circuit 300 may take on many forms, such as part of a larger complex circuit. For example, pipeline electronic circuit 300 may form part of a processor in a desktop computer, notebook computer, server, or other form factor computer or data processing system. The pipeline electronic circuit may also take other form factors such as a gaming device, a personal digital assistant (PDA), a communication device or any other device that includes pipeline system architecture.

Figure 4:
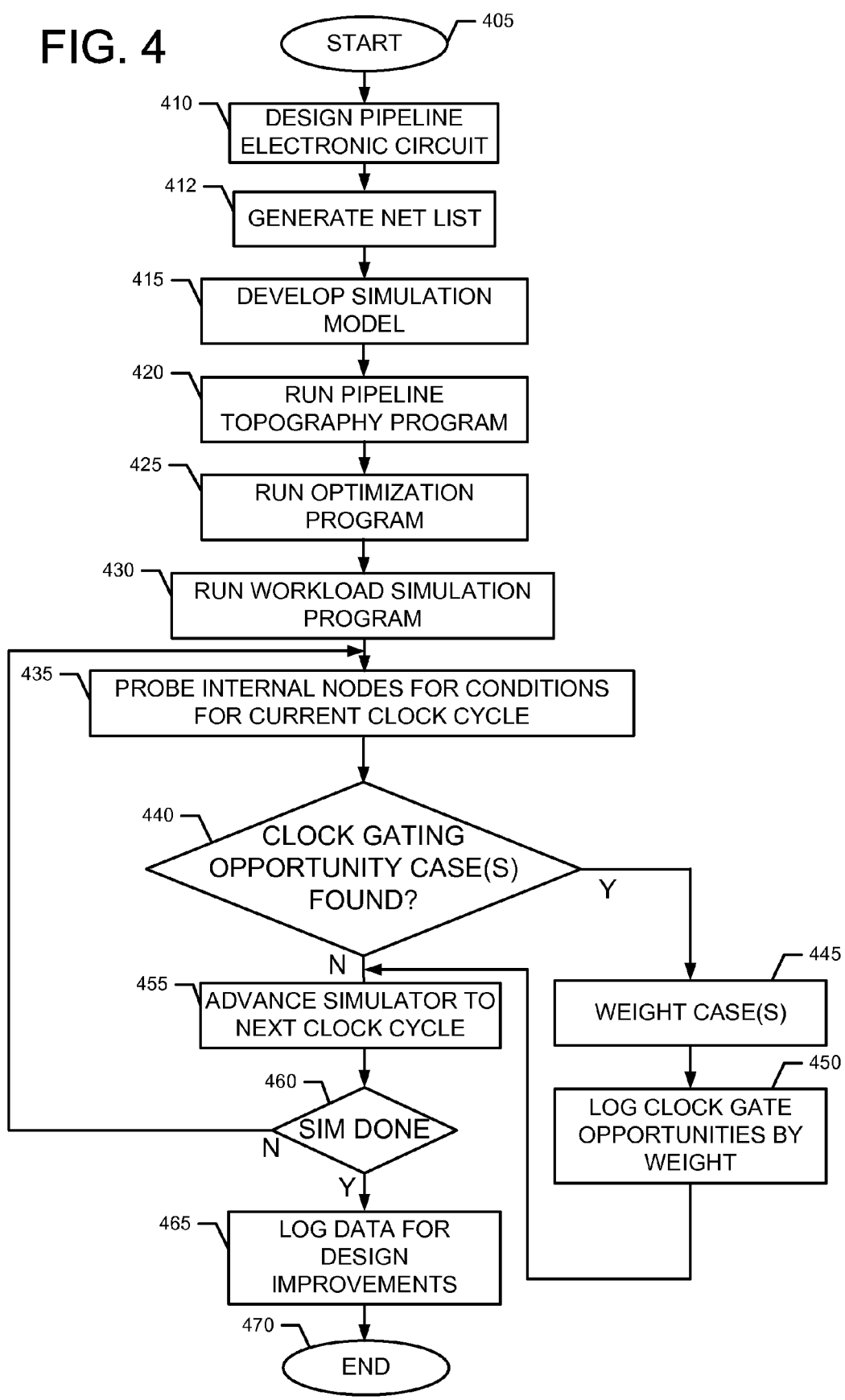
FIG. 4 is a flow chart that depicts the disclosed clock gating methodology.

FIG. 4 is a flow chart that depicts design and operation methodologies for one embodiment of the disclosed clock gating opportunity process. Process flow commences at start block 405. A circuit designer designs a pipeline electronic circuit that includes multiple pipeline stages, as per design pipeline electronic circuit block 410. The designer may use conventional techniques to generate a net list that describes the multiple pipeline stages including the logic circuitry, connections, nodes and other information descriptive of the pipeline electronic circuit, as per block 412. For example, the designer may generate such a net list by a time-consuming manual process or by computer assistance with a net list generation tool. In one embodiment, simulator 380 produces the simulation model 382 by using register transfer level (RTL) language programming. More specifically, simulator 380 converts the net list into a software simulation of latches and interconnecting Boolean expressible logic functions that correspond to and represent pipeline electronic circuit 300. Simulator 380 develops the simulation model 382 from the net list, as per develop simulation model block 415. Simulator 380 executes a simulation program 385 such as topography program 392, to develop topographic data for the particular pipeline electronic circuit 300, as per block 420. Topographic results remain in simulator 380 for use as part of final decision making criteria for identifying clock gating opportunities below. Simulator 380 also executes a simulation program 385 such as optimization program 394 to reduce the amount of data that simulator 380 analyzes, as per block 425. In one embodiment, optimizing the current simulation model 382 generates enhancements to the software simulation model 382 for all subsequent simulator 380 processes shown in FIG. 4.

Simulator 380 also executes a simulation program 385 such as workload simulation program 396, with real-world workload digital 1's and 0's data, as per block 430. By simulating real workload through the pipeline electronic circuit 300 simulation, more realistic results, namely the observable clock gating opportunities of pipeline electronic circuit 300 are observable by simulator 380. Simulator 380 reads these clock gating opportunities by probing internal nodes for conditional events such as those cases shown in Table 1, as per block 435. Each of cases 1-5 of Table 1 represents a condition for which simulator 380 may identify that a clock gate opportunity exists in pipeline electronic circuit 300. For example, the simulator 380, running workload simulation program 396 may identify latch A1 or group of latches A1 and B1 in STAGE 1 as exhibiting a clock gating opportunity under cases 1-5 of Table 1. Simulator 380 may identify latch A1 or any group combination of latch M1 in STAGE 1 as exhibiting a clock gating opportunity under one of cases 1-5 of Table 1. The clock gating opportunity(s) pass to the next operation wherein simulator 380 verifies that the process found one of cases 1-5 that exhibits a clock gating opportunity as per clock gating opportunity case(s) found decision block 440. If simulator 380 finds that a particular component in a pipeline stage exhibits a clock gating opportunity that corresponds to one of cases 1-5 of Table 1 then, because we have a "CASE(S) FOUND", process flow continues to weight case(s) block 445. Simulator 380 applies a weight to each currently found case that exhibits a clock gating opportunity, as per block 445. Case weighting provides a method to determine which clock gating opportunity provides a greater power savings than another. Clock gating opportunities with greater power savings rate higher than clock gating opportunities with less power savings potential. The decision criteria discussed below determines the particular weight that each particular case receives.

Case weighting is an aspect of the disclosed methodology wherein specific categories of clock gating opportunities exhibit a greater opportunity for circuit design improvements than other clock gating opportunities. For example, a clock-gated latch type that simulator 380 detects as the source of a clock gating opportunity is more valuable than a latch which simulator 380 detects as a "do not care" (DNC) type of clock gating opportunity. A reason for this value rating or weighting is that clock-gated latch types are highly predictable, and clock gating circuitry is always present. In the case where the latch presents a "do not care" DNC type clock gating opportunity, the clock gating opportunity may represent no clock gating opportunity in other clock cycles. Namely clock cycles N+1, N+2, and so on, may represent a non DNC clock gating opportunity. Simulator 380 assigns a particular weight value to each clock gating opportunity type as shown in Table 2 below.

TABLE 2

| CATEGORY | DESCRIPTION OF CLOCK GATING OPPORTUNITY CATEGORY TO WHICH SIMULATOR WILL ASSIGN A WEIGHT VALUE | WEIGHT VALUE |
| --- | --- | --- |
| A | Multiple latches with common clock gating opportunity | H |
| B | Downstream clock gating opportunity | H |
| C | Do not care (DNC) latch(s) | M |
| D | Do not change latch(s) | L |
| E | Upstream clock gating opportunity | L |

As shown in Table 2 above, category "A" represents multiple latches that exhibit a common clock gating opportunity in a particular stage that exhibit a high weighting or "H" value. A group of latches in a particular stage that exhibit a clock gating opportunity have a larger case weight than a single latch exhibiting the same opportunity. The group of multiple latches represent a greater potential for power consumption reduction with the same amount of clock gating circuitry. Another example of weighting is the simulator 380 analysis of upstream or downstream clock gating opportunity. The case weight is larger as shown in Table 2 category "B" if the clock gating opportunity resides downstream from the simulation program 385 clock gating case data, in this case the weighting is "H" for high. For example, simulator 380 gives a particular clock gating opportunity a larger weight than another clock gating opportunity if the particular clock gating opportunity is downstream of the other clock gating opportunity. This is so because downstream clock gating opportunities are easier to predict.

The category "C" example as shown in Table 2 for do not care (DNC) clock gating opportunities represents a weighting value of "M" or medium. The latch(s) that simulator 380 determines can be clock gating opportunities due to the latch (s) that exhibit a do not care state are less of an opportunity value than the higher or "H" value ratings in Table 2 above. Another example of value weighting is shown in category "D" as do not change latch(s) with the lowest case weight value of "L" or low. Simulator 380 detects latch(s) that exhibit no state change from clock cycle N to clock cycle N+1. Yet another example is shown in Table 2 as category "E" as upstream clock gating opportunities that have a weight value of "L" or low. A clock gating opportunity that simulator 380 detects as upstream from the current simulation state or clock cycle N, represents the lowest case weighting opportunity of the values of Table 2. Once the simulator 380, running workload simulation program 396 completes the weighting operation, simulator 380 logs the clock gate opportunities by weight, as per block 450.

As the log of clock gate opportunities completes or the clock gating opportunity case(s) found decision of block 440 yields a false result, the simulator 380 advances to the next clock cycle, as per advance simulator block 455. As the simulator 380 advances clock cycle by clock cycle, namely clock cycle N to clock cycle N+1 and so on, the workload simulator program 396 compiles opportunities for clock gating. The more clock cycles that the simulator 380 advances, the more the workload simulator program 396 will log clock gating opportunities for the pipeline electronic circuit 300 design. Clock gating opportunities for a specific latch or latches are a combination of the total simulation data from the simulation process of FIG. 4 from start to finish. Simulator 380 may find a specific clock gating opportunity for latch A1 at one clock cycle N. However, designers inspect the total clock gating data before they design clock gating circuits. The accumulation of all clock gating opportunities and the interconnecting logic between latches and latch groups constitutes the ultimate design guideline output of simulator 380.

Clock gating opportunities are more complete and of greater value after an expansive workload simulation program 396 runs. For example, workload simulation program 396 may detect a least significant data bit, such as the output data of latch A1, exhibiting a clock gating opportunity early in workload simulation program 396. Workload simulation program 396 may pass through many clock cycles of simulation without detecting any change to the data output of latch A1 and log the potential clock gating opportunity as a DNC case such as in case 1 of Table 1. After many simulation clock cycles the data output of latch A1 may represent a good opportunity for clock gating. However, since latch A1 represents a lower order data bit, eventually during the workload simulation program, the bit may change and exhibit poor candidacy for clock gating across the entire simulation. If the simulation stops early the bit appears as clock gateable. However if the workload simulation program 396 is run for an extensive number of clock cycles, the bit may toggle and that latch A1 is now no longer a candidate for clock gating. If the simulation program 385 is not complete, decision block 460 will yield a false result and simulator 380 returns to probing internal nodes for conditions, again as per block 435. If, however the results of decision block 460 yield a positive result, the simulation is complete and simulator 380 logs all results of clock gate opportunities for consideration as design improvements to the current design. The simulation operation completes, as per end block 470.

Figure 5:
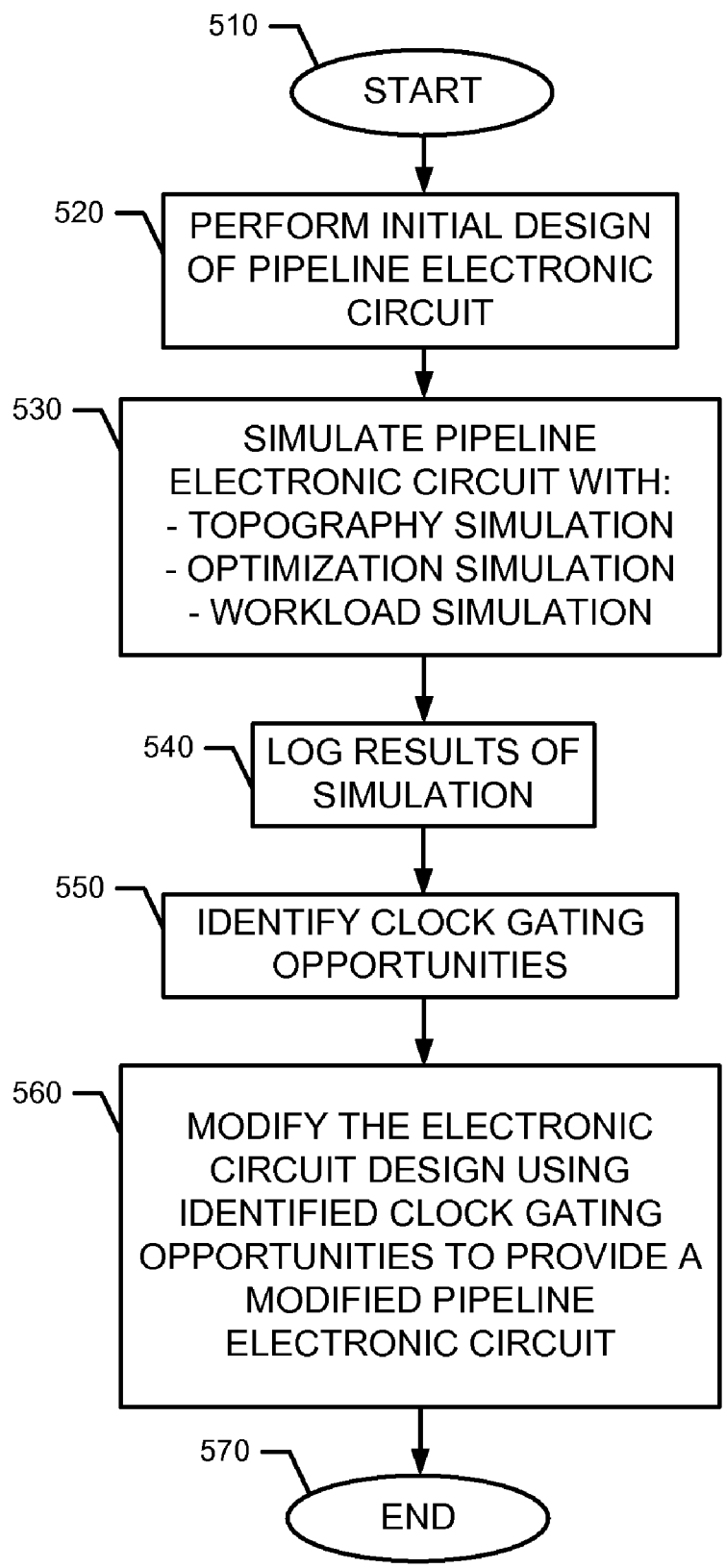
FIG. 5 is a flow chart that depicts the disclosed clock gating design improvement methodology.

FIG. 5 is a flowchart that represents a design improvement process. Flow begins at start block 510. Circuit designers design an initial or preliminary version of pipeline electronic circuit 300 using conventional circuit design practices, as per block 520. After completion of the initial or preliminary electronic circuit design of block 520, simulator 380 executes topography, optimization, and workload simulation programs 385 to complete a simulation of the preliminary version of pipeline electronic circuit 300 as taught herein, as per block 530. The results of the simulator 380 process is a log of clock gating opportunities that may be an organization of data by case, by weight, by latch, or grouping of latches, or by any other criteria which represents useful input into design change opportunities thru clock gating. The simulation process logs clock gating opportunity simulation results, as per block 540. Circuit designers evaluate the total simulator 380 results to identify the best opportunities for clock gating implementation, as per block 550. By combining all of the results and identifying a latch or group of latches that can benefit from clock gating, the designer is able to modify the initial or preliminary pipeline electronic circuit design with discrete clock gating circuitry to improve the design of pipeline electronic circuit 300. Designers may thus generate modified pipeline electronic circuit designs by utilization of the identified clock gating opportunities that result from the simulation process, as per block 560. The modified pipeline electronic circuit may thus achieve power consumption reduction via clock gating circuitry that addresses the identified clock gating opportunities. As one example, designers may generate clock gating circuits such as clock gating circuit 305(A1), 305(B1), through 305(M1) for STAGE 1 of pipeline electronic circuit 300 using the identified clock gating opportunity results of the simulation. The clock gating circuits represent any combination of cases per case Table 1. Designers may generate clock gating circuits such as clock gating circuit 305(A2), 305(B2), through 305(N2) for STAGE 2 of pipeline electronic circuit 300. The improvement process completes, per end block 570. In this manner, the designers provide an improved or modified final version of pipeline electronic circuit 300.

Figure 6:
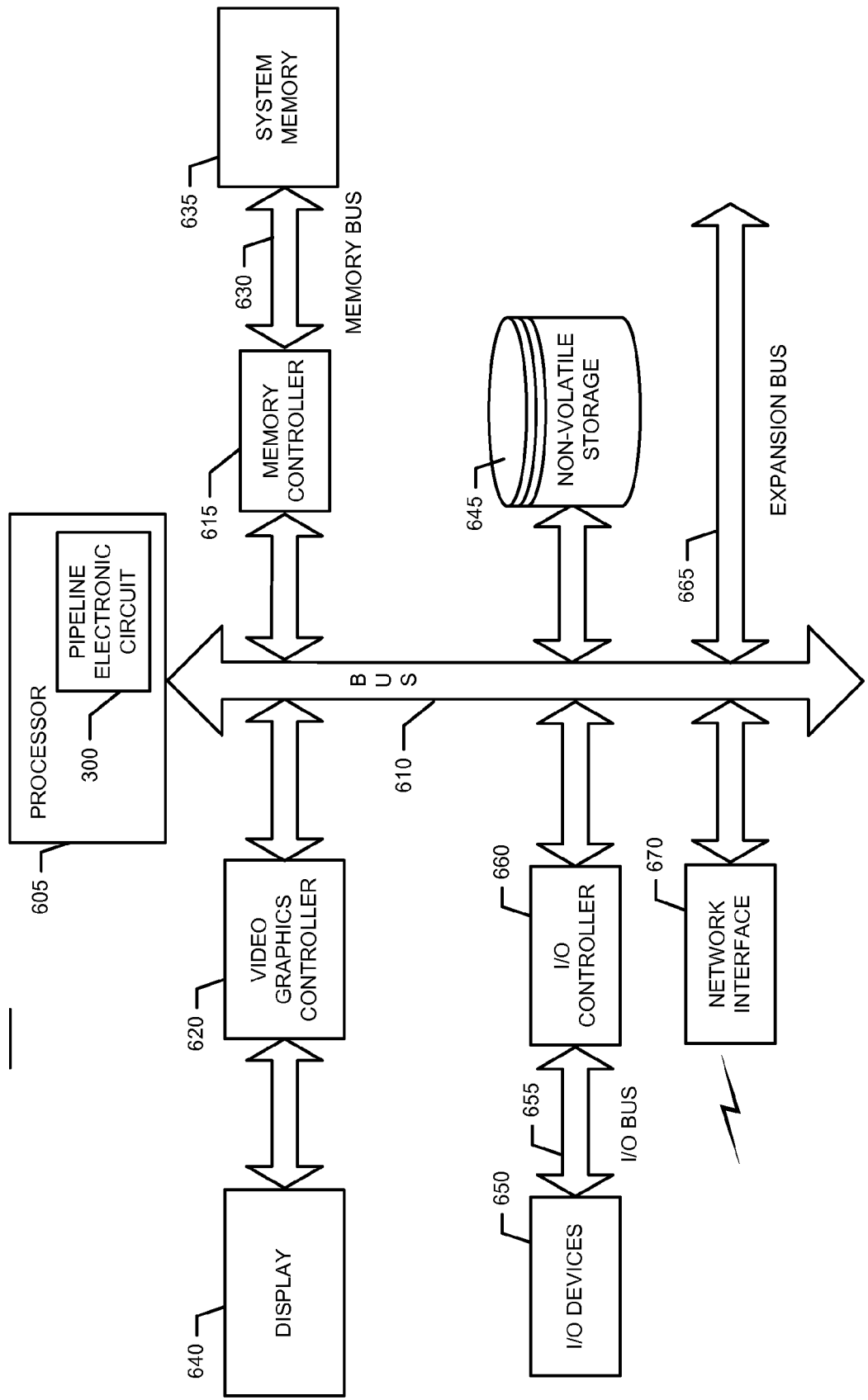
FIG. 6 is a block diagram of an information handling system employing the disclosed clock gating methodology.

FIG. 6 shows a simplified block diagram of a representative information handling system (IHS) 600 that employs a processor 605. In one embodiment, processor 605 includes pipeline electronic circuit 300. IHS 600 further includes a bus 610 that couples processor 605 to memory controller 615 and video graphics controller 620. More particularly, system memory bus 630 couples to system memory 635 as shown. In actual practice, bus 610 may include multiple buses, for example a memory bus and an I/O bus. A display 640 couples to video graphics controller 620. Nonvolatile storage 645, such as a hard disk drive, CD drive, DVD drive, or other nonvolatile storage couples to bus 610 to provide IHS 600 with permanent storage of information. I/O devices 650, such as a keyboard and a mouse pointing device, couple via I/O bus 655 and I/O controller 660 to bus 610. One or more expansion busses 665, such as USB, IEEE 1394 bus, ATA, SATA, PCI, PCIE and other busses, couple to bus 610 to facilitate the connection of peripherals and devices to IHS 600. A network interface adapter 670 couples to bus 610 to enable IHS 600 to connect by wire or wirelessly to a network and other information handling systems. While FIG. 6 shows one IHS that employs pipeline electronic circuit 300 in processor 605, the IHS may take many forms. For example, IHS 600 may take the form of a desktop, server, portable, laptop, notebook, or other form factor computer or data processing system. IHS 600 may take other form factors such as a gaming device, a personal digital assistant (PDA), a portable telephone device, a communication device or other devices that include a processor and memory.

Figure 7:
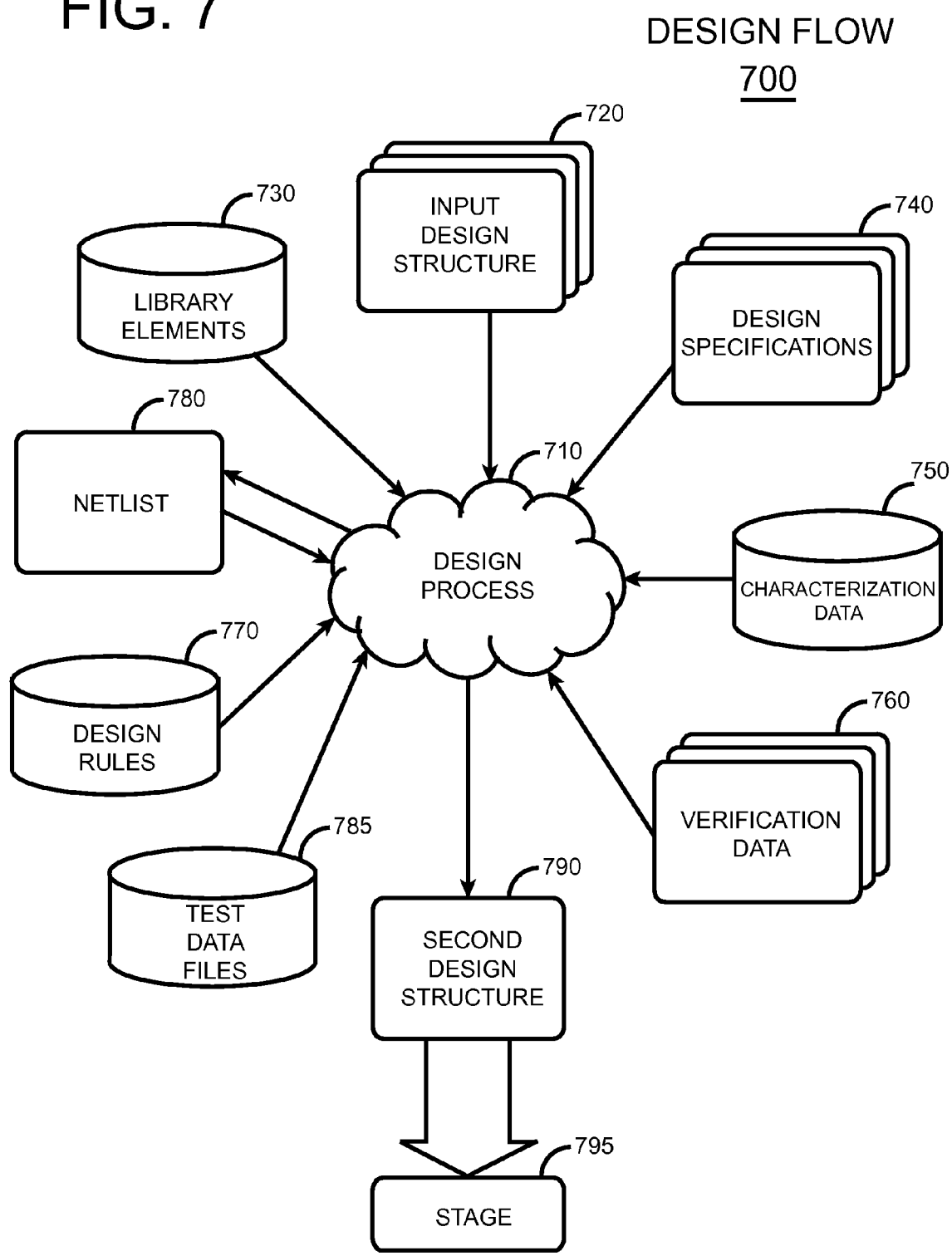
FIG. 7 shows a flow diagram of a design process used in semiconductor design, manufacture, and/or test of the pipeline electronic circuit.

FIG. 7 shows a block diagram of an exemplary design flow 700 used for example, in semiconductor IC logic design, simulation, test, layout, and manufacture. Design flow 700 includes processes and mechanisms for processing design structures to generate logically or otherwise functionally equivalent representations of the embodiment of the invention shown in FIG. 3. The design structures processed and/or generated by design flow 700 may be encoded on machine-readable transmission or storage media to include data and/or instructions that when executed or otherwise processed on a data processing system generate a logically, structurally, or otherwise functionally equivalent representation of hardware components, circuits, devices, or systems.

FIG. 7 illustrates multiple such design structures including an input design structure 720 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a machine-readable data transmission or storage medium, design structure 720 may be accessed and processed by one or more hardware and/or software modules within design process 710 to simulate or otherwise functionally represent an electronic component, circuit, electronic or logic module, apparatus, device, or system such as those shown in FIG. 3. As such, design structure 720 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of the components, circuits, devices, or logic structures shown in FIGS. 1 and 2 to generate a netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable data storage medium. The medium may be a non-volatile storage medium such as a magnetic or optical disk drive, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 710 may include hardware and software modules for processing a variety of input data structure types including netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include modules for performing standard circuit design processes such as timing analysis, verification, design rule checking, place and route operations, etc.

Design process 710 employs and incorporates well-known logic and physical design tools such as HDL compilers and simulation model build tools to process design structure 720 together with some or all of the depicted supporting data structures to generate a second design structure 790. Similar to design structure 720, design structure 790 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIG. 3. In one embodiment, design structure 790 may comprise a compiled, executable HDL simulation model that functionally simulates the devices shown in FIG. 3.

Design structure 790 may also employ a data format used for the exchange of layout data of integrated circuits and/or symbolic data format (e.g. information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data processed by semiconductor manufacturing tools to fabricate embodiments of the invention as shown in FIG. 3. Design structure 790 may then proceed to a stage 795 where, for example, design structure 790: proceeds to tape-out, is released to manufacturing, is released to a mask house, is sent to another design house, is sent back to the customer, etc.

The foregoing describes a design structure that in one embodiment specifies a pipeline electronic circuit and design that enables power conservation in the stages of the pipeline by identifying clock-gating opportunities. In one embodiment, simulation results may assist the designer of the design structure in achieving power conservation by incorporating clock-gating circuitry among the stages of the pipeline at clock gating opportunity locations that the simulation identifies.

Modifications and alternative embodiments of this invention will be apparent to those skilled in the art in view of this description of the invention. Accordingly, this description teaches those skilled in the art the manner of carrying out the invention and is intended to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A design structure embodied in a nontransitory machine readable medium for designing, manufacturing, or testing an integrated circuit, the design structure comprising:
a pipeline electronic processor device including a plurality of pipeline stages, the plurality of pipeline stages including first and second pipeline stages that each include logic elements that may be clock-gated, each pipeline stage supplying information to a downstream pipeline stage, wherein selected logic elements are clock-gated based on simulation results of a simulation of the pipeline electronic processor device, the simulation specifying the selected logic elements that may be clock-gated under predetermined conditions to achieve power conservation in an information handling system (IHS), the simulation including looking upstream and downstream in the plurality of pipeline stages to determine the selected logic elements that may provide clock gating opportunities, each clock gating opportunity corresponding to a respective clock gating opportunity type, wherein the simulation provides simulation results and further wherein the simulation includes weighting the selected logic elements according to their respective clock gating opportunity types, thus indicating their respective power savings potential when clock gated, thus providing weighted results included in the simulation results.

2. The design structure of claim 1, wherein the simulation includes analyzing the second pipeline stage for clock-gating opportunities by monitoring the first pipeline stage for first pipeline logic elements that do not change logic state from clock cycle to clock cycle.

3. The design structure of claim 1, wherein the simulation includes analyzing the second pipeline stage for clock-gating opportunities by monitoring the first pipeline stage for first pipeline logic elements that are already clock-gated from clock cycle to clock cycle.

4. The design structure of claim 1, wherein the simulation includes analyzing the first pipeline stage for clock-gating opportunities by monitoring the second pipeline stage for first pipeline logic elements that do not change logic state from clock cycle to clock cycle.

5. The design structure of claim 1, wherein the design structure is a netlist.

6. The design structure of claim 1, wherein the design structure resides on a storage medium as a data format used for the exchange of layout data of integrated circuits.

7. A hardware description language (HDL) design structure encoded on a machine-readable data storage medium, said HDL design structure comprising elements that when processed in a computer-aided design system generates a machine-executable representation of a pipeline electronic processor device, wherein said HDL design structure comprises:

a first element processed to generate a functional computer-simulated representation of the pipeline electronic processor device including a plurality of pipeline stages, the plurality of pipeline stages including first and second pipeline stages that each include logic elements that may be clock-gated, each pipeline stage supplying information to a downstream pipeline stage, wherein selected logic elements are clock-gated based on simulation results of a simulation of the pipeline electronic processor device, the simulation specifying the selected logic elements that may be clock-gated under predetermined conditions to achieve power conservation in an information handling system (IHS), the simulation including looking upstream and downstream in the plurality of pipeline stages to determine the selected logic elements that may provide clock gating opportunities, each clock gating opportunity corresponding to a respective clock gating opportunity type, wherein the simulation provides simulation results and further wherein the simulation includes weighting the selected logic elements according to their respective clock gating opportunity types, thus indicating their respective power savings potential when clock gated, thus providing weighted results included in the simulation results.

8. The HDL design structure of claim 7, wherein the simulation includes analyzing the second pipeline stage for clock-gating opportunities by monitoring the first pipeline stage for first pipeline logic elements that do not change logic state from clock cycle to clock cycle.

9. The HDL design structure of claim 7, wherein the simulation includes analyzing the second pipeline stage for clock-gating opportunities by monitoring the first pipeline stage for first pipeline logic elements that are already clock-gated from clock cycle to clock cycle.

10. The HDL design structure of claim 7, wherein the simulation includes analyzing the first pipeline stage for clock-gating opportunities by monitoring the second pipeline stage for first pipeline logic elements that do not change logic state from clock cycle to clock cycle.

11. The HDL design structure of claim 7, wherein the design structure is a netlist.

12. The HDL design structure of claim 7, wherein the design structure resides on a storage medium as a data format used for the exchange of layout data of integrated circuits.

13. A method in a computer-aided design system for generating a functional design model of a pipeline electronic processor device, the method comprising:

generating a functional computer-simulated representation of the pipeline electronic processor device including a plurality of pipeline stages, the plurality of pipeline stages including first and second pipeline stages that each include logic elements that may be clock-gated, each pipeline stage supplying information to a downstream pipeline stage, wherein selected logic elements are clock-gated based on simulation results of a simulation of the pipeline electronic processor device, the simulation specifying the selected logic elements that may be clock-gated under predetermined conditions to achieve power conservation in an information handling system, the simulation including looking upstream and downstream in the plurality of pipeline stages to determine the selected logic elements that may provide clock gating opportunities, each clock gating opportunity corresponding to a respective clock gating opportunity type, wherein the simulation provides simulation results and further wherein the simulation includes weighting the selected logic elements according to their respective power clock gating opportunity types, thus indicating their respective savings potential when clock gated, thus providing weighted results included in the simulation results.

14. The method of claim 13, wherein the simulation includes analyzing the second pipeline stage for clock-gating opportunities by monitoring the first pipeline stage for first pipeline logic elements that do not change logic state from clock cycle to clock cycle.

15. The method of claim 13, wherein the simulation includes analyzing the second pipeline stage for clock-gating opportunities by monitoring the first pipeline stage for first pipeline logic elements that are already clock-gated from clock cycle to clock cycle.

16. The method of claim 13, wherein the simulation includes analyzing the first pipeline stage for clock-gating opportunities by monitoring the second pipeline stage for first pipeline logic elements that do not change logic state from clock cycle to clock cycle.

17. The method of claim 13, wherein the design structure is a netlist.

18. The method of claim 13, wherein the design structure resides on a storage medium as a data format used for the exchange of layout data of integrated circuits.

* * * * *